United States Patent
Desbois et al.

(10) Patent No.: US 9,139,752 B2
(45) Date of Patent: Sep. 22, 2015

(54) PROCESS FOR PRODUCING POLYAMIDES VIA ANIONIC POLYMERIZATION

(71) Applicants: Philippe Desbois, Edingen-Neckarhausen (DE); Bernd Bruchmann, Freinsheim (DE); Dietrich Scherzer, Neustadt (DE); Andreas Wollny, Ludwigshafen (DE); Andreas Radtke, Mannheim (DE)

(72) Inventors: Philippe Desbois, Edingen-Neckarhausen (DE); Bernd Bruchmann, Freinsheim (DE); Dietrich Scherzer, Neustadt (DE); Andreas Wollny, Ludwigshafen (DE); Andreas Radtke, Mannheim (DE)

(73) Assignee: BASF SE, Ludwigshafen (DE)

(*) Notice: Subject to any disclaimer, the term of this patent is extended or adjusted under 35 U.S.C. 154(b) by 131 days.

(21) Appl. No.: 13/630,462

(22) Filed: Sep. 28, 2012

(65) Prior Publication Data

US 2013/0079465 A1    Mar. 28, 2013

Related U.S. Application Data

(60) Provisional application No. 61/540,003, filed on Sep. 28, 2011.

(51) Int. Cl.
| | |
|---|---|
| *C08G 69/14* | (2006.01) |
| *C09D 177/02* | (2006.01) |
| *C08G 69/18* | (2006.01) |
| *C08G 18/80* | (2006.01) |
| *C08G 69/20* | (2006.01) |

(52) U.S. Cl.
CPC .............. *C09D 177/02* (2013.01); *C08G 69/18* (2013.01); *C08G 18/8074* (2013.01); *C08G 69/20* (2013.01); *C08J 2475/00* (2013.01)

(58) Field of Classification Search
CPC .. C08J 2475/00; G08G 69/18; C08G 18/8074
USPC .................................. 524/606; 528/310, 315
See application file for complete search history.

(56) References Cited

U.S. PATENT DOCUMENTS

| 3,423,372 A | | 1/1969 | Steely | |
|---|---|---|---|---|
| 4,611,052 A | * | 9/1986 | Vrinssen et al. | 528/312 |
| 4,754,000 A | | 6/1988 | Meyer et al. | |
| 2011/0213076 A1 | * | 9/2011 | Makal et al. | 524/590 |
| 2011/0288258 A1 | * | 11/2011 | Desbois et al. | 528/45 |

FOREIGN PATENT DOCUMENTS

| EP | 0 156 129 A1 | 10/1985 |
|---|---|---|
| EP | 1 091 991 B1 | 11/2003 |

OTHER PUBLICATIONS

Dencheva et al "Preparation and Properties of Polyamide-6 Based Thermoplastic Laminate Composites by a Novel In-Mold Polymerization Technique", NYRIM laminates, published online on Nov. 2013.*

* cited by examiner

*Primary Examiner* — Gregory Listvoyb
(74) *Attorney, Agent, or Firm* — Oblon, McClelland, Maier & Neustadt, L.L.P.

(57) ABSTRACT

The present invention relates to a process for producing polyamides, preferably crosslinked polyamides, via anionic polymerization of lactams in the presence of an anionic catalyst and of a caprolactam-capped polyisocyanate, where said isocyanate comprises more than 3.5 capped isocyanate groups.

16 Claims, No Drawings

PROCESS FOR PRODUCING POLYAMIDES VIA ANIONIC POLYMERIZATION

The present invention relates to a process for producing polyamides, preferably crosslinked polyamides, via anionic polymerization of lactams in the presence of an anionic catalyst and of a caprolactam-capped polyisocyanate, where said isocyanate comprises more than 3.5 capped isocyanate groups.

Lactams, for example caprolactam, can be polymerized anionically. This process generally uses a catalyst, and also an initiator (also termed activator) (activated anionic polymerization).

An initiator or activator often used hitherto has comprised diisocyanates or derivatives of these. U.S. Pat. No. 4,754,000 (Bayer AG) describes the activated anionic polymerization of lactams for producing polyamides, by using, as activator, polyisocyanates which comprise biuret groups and which derive from nonaromatic diisocyanates.

EP 1091991 (BASF AG) discloses a composition which comprises, as component A, a polyisocyanurate having an average NCO functionality of more than 3.5, and also a process for producing a surface coating composition by using the composition described.

U.S. Pat. No. 3,423,372 uses an uncapped polyisocyanate, thus markedly reducing reactivity, with very low activator concentration in the examples (1/200-1/50 molar). The polymerization takes more than 3 minutes with the concentrations used in the U.S. patent.

EP 0156129 uses a rubber (i.e. an elastomer) as precursor of the multifunctional activator, and therefore the resultant PA is not stiff, with a maximum of 1.12 GPa. Said activator has high Mw, and a large amount of activator is required here (at least 20%). A mixture of a bifunctional and a polyfunctional activator is used; the resultant polyamide is therefore not a crosslinked material.

For the purposes of the present invention, the expressions "cast polymerization" and "cast polyamide" refer to a particular type of polymerization, in particular a type of polymerization which does not use elevated pressure (e.g. as is usual in injection molding), and respectively to the resultant polyamide.

However, the systems described hitherto have only very limited capability for producing polyamides with high molecular weight. The only possibility has been to reduce the concentration of the activator, but this simultaneously drastically reduces the reactivity of the system. The polyamides produced conventionally are moreover not crosslinked materials, and are therefore thermoplastics; it has not been possible to achieve a high level of crosslinking, with the advantageous thermoset properties associated therewith (for example better creep, higher chemicals resistance).

An object was therefore to provide a process which can produce polyamide, in particular cast polyamide, and which provides access to high-molecular-weight polyamides which have a higher level of crosslinking.

Surprisingly, said object has now been achieved via use of a novel initiator (or activator), as in particular defined in the claims.

The present invention therefore provides a process for producing polyamide, preferably crosslinked polyamide, via anionic polymerization of at least one lactam in the presence of anionic catalyst and of an activator, where the activator is a caprolactam-capped polyisocyanate and comprises on average more than 3.5 capped isocyanate groups, preferably at least four, particularly preferably at least 5, very particularly preferably at least 8, and most preferably at least 10, where the molar ratio of lactam to the activator is preferably from 1:1 to 10 000:1, particularly preferably from 10:1 to 1000:1, and very particularly preferably from 20:1 to 500:1, and where the temperature during the reaction is preferably from 70 to 300° C., particularly preferably from 100 to 170° C., very particularly preferably from 120 to 170° C.

For the purposes of the present invention, the expression "crosslinked polyamide" means that at least one crosslinking point is present per polymer chain.

For the purposes of the present invention, the expression "capped isocyanate group" refers to an isocyanate group which has been blocked by another functional group, e.g. a caprolactam group. Said group then acts as "protective group", blocking the isocyanate group during the reaction.

The present invention further provides a polyamide, preferably crosslinked polyamide, that can be produced by the process of the invention, and also the use of a polyamide, preferably crosslinked polyamide, that can be produced by the process of the invention, as coating, structural element, packaging film, or laser-sintering powder, and/or during rotor molding.

In one preferred embodiment of the invention, the initiator comprises on average at least four, particularly preferably five, capped isocyanate groups.

In another preferred embodiment of the invention, the initiator comprises on average at least eight, particularly preferably at least ten, capped isocyanate groups.

The number of capped isocyanate groups in the initiator (activator) is calculated here as average over all of the initiator used, which can be a mixture of various compounds.

Since production of the initiator, for example via oligomerization of diisocyanates, generally does not produce pure products but instead produces compounds with varying degrees of oligomerization, the functionality of the resultant compounds can be stated only as an average value.

The proportion of capped isocyanate groups can be determined via titration. In this method, by way of example, the compound or mixture comprising capped isocyanate groups is reacted with amine compounds, e.g. dibutylamine, thus producing urea derivatives. The excess amine is then back-titrated with HCl.

The initiator can be produced by analogy with the process described in EP 1 091 991 B1 (see in particular paragraphs [0026] to [0030]).

In one embodiment of the invention, the initiator is an isocyanurate; in another embodiment of the invention, the initiator can be produced from a polyol or from a polyamine. However, it is preferable that the activator comprises no polyol.

As an alternative, acyl halides having on average more than 3.5 capped acyl halide groups are also suitable as initiator for the activated anionic polymerization of a lactam.

A suitable lactam is inter alia caprolactam, piperidone, pyrrolidone, lauryllactam, or a mixture of these.

In one preferred embodiment of the invention, a compound from the group comprising caprolactam, lauryllactam, and mixtures of these is used; particular preference is given here to caprolactam or lauryllactam.

It is also possible to copolymerize cyclic lactones.

A suitable catalyst is inter alia sodium caprolactamate, potassium caprolactamate, magnesium bromide caprolactamate, magnesium chloride caprolactamate, magnesium bis-caprolactamate, sodium hydrides, sodium metal, sodium hydroxide, sodium methoxide, potassium ethoxide, sodium propoxide, sodium butoxide, potassium hydride, potassium metal, potassium hydroxide, potassium methoxide, potassium ethoxide, potassium propoxide, or potassium butoxide.

The catalyst for the process of the invention is preferably selected from the group comprising sodium hydrides, sodium metal, sodium caprolactamate; particular preference is given here to sodium caprolactamate (e.g. Bruggolen® C 10, a solution of 18% by weight of sodium caprolactamate in caprolactam).

The polymer can also, of course, be mixed with one or more of the conventional additives, for example flow improvers, stabilizers, mold-release agents, flame retardants, fillers (e.g. organic and/or inorganic fillers), lubricants, and prepolymers, or polymers dispersed or soluble in the monomers.

The molar ratio of lactam to the catalyst can vary widely but is generally from 1:1 to 10 000:1, preferably from 10:1 to 1000:1, particularly preferably from 20:1 to 300:1.

The molar ratio of activator to the catalyst can vary widely but is generally from 10:1 to 1:100, preferably from 5:1 to 1:10, particularly preferably from 2:1 to 1:5.

The molar ratio of lactam to the activator can vary widely but is generally from 1:1 to 10 000:1, preferably from 10:1 to 1000:1, particularly preferably from 20:1 to 500:1.

The temperature during the reaction can vary widely; it is generally from 70 to 300° C., preferably from 100 to 170° C., particularly preferably from 120 to 170° C.

In one preferred embodiment of the process of the invention, precisely one lactam is used.

In another preferred embodiment of the process of the invention, precisely one catalyst is used.

In another preferred embodiment of the process of the invention, precisely one initiator is used.

In one particularly preferred embodiment of the process of the invention, precisely one lactam, precisely one catalyst, and precisely one initiator are used.

The process of the invention can inter alia take the form of cast polymerization, spray polymerization, reactive extrusion, dispersion polymerization, or rotor molding.

When the process of the invention is carried out with the activator of the invention, the molecular weight ($M_w$) of the polyamide products is increased. At the same time, a higher level of crosslinking is achieved, and is apparent from the increased viscosity of the products.

The polyamides that can be produced in the invention can be used inter alia as structural materials in automobile construction in the interior, exterior, body, or chassis, examples being passenger compartment, underbody, load-bearing structures, wheel surrounds, inliners for tanks, gearwheels and housings, and as coating, packaging film, or laser-sintering powder, and/or during rotor molding.

EXAMPLES

Some examples illustrating the invention are given in the following section. These examples are merely illustrative and are certainly not intended to restrict the scope of the present invention.

Production of the Polyisocyanates:

Hexamethylene diisocyanate (HDI) was used as initial charge under nitrogen, and the material was heated to 80° C. 400 ppm by weight (based on diisocyanate) of the catalyst N,N,N-trimethyl-N-(2-hydroxypropyl)ammonium 2-ethylhexanoate, were added, and the mixture was allowed to react at 80° C., and the reaction was terminated at the desired NCO content of the crude product by adding 400 ppm by weight (based on diisocyanate) of di-2-ethylhexyl phosphate. In order to remove monomeric HDI, the reaction mixture was then distilled at elevated temperature and reduced pressure (2.5 mbar) in a thin-film evaporator. Residual HDI monomer content was below 0.3% by weight.

Initiator A1: 80% by weight of capped aliphatic polyisocyanates, mixed with caprolactam at 80° C. for 30 min., thus giving 44.97% by weight of capped polyisocyanates in 55.03% by weight of caprolactam.

Initiator A2: comprises 22.49% by weight of capped aliphatic polyisocyanates in 77.51% by weight of caprolactam.

The invention can also use uncapped initiators (without caprolactam).

Inventive Examples 1 and 2 and Comparative Example A:

Synthesis of nylon-6 via anionic polymerization of ε-caprolactam

All the polymerization reactions were carried out at 140° C. with stirring under dry argon in a 50 ml glass calorimeter reactor sealed with a grease-free Teflon dish and provided with a thermocouple.

Intrinsic viscosity (IV) was determined in accordance with ISO 307 (using C=5 g/l in 96% sulfuric acid).

Residual caprolactam was determined chromatographically. The DSC measurements were carried out in a Q-2000 calorimeter from Waters GmbH. Input weight was about 8.5 mg, and the heating and cooling rate were 20 K/min. The measurements on the specimens were based on ISO 11357-2, 3, and 7. An enthalpy of fusion of 220 J/g for a 100% crystalline polyamide was taken as reference.

Comparative Example A 8.34 g (73.8 mmol) of ε-caprolactam and 0.51 g (1.04 mmol) of Bruggolen® C20 (80% w/w blocked diisocyanate in ε-caprolactam) were mixed at 140° C. in the reactor and kept at a temperature of 140° C. for a few minutes. Once the temperature of the mixture had reached 140° C., 1.15 g (1.44 mmol) of Bruggolen® C 10 catalyst (17% w/w ε-caprolactamate in ε-caprolactam) was added as solid at room temperature (RT) to the molten mixture, and polymerization was allowed to proceed for 10 minutes; the system was then quenched by cooling the reactor in water (10° C.). This gave 9.92 g of nylon-6 as solid.

A maximum temperature of 180.6° C. was measured after 52 sec.

The polymer comprises 1.5% of residual caprolactam and its solution viscosity is 185.

Crystallinity was measured as 30%.

Inventive Example 1

7.83 g (69.3 mmol) of ε-caprolactam and 1.02 g of initiator A (44.97% w/w in ε-caprolactam) were mixed at 140° C. in the reactor and kept at a temperature of 140° C. for a couple of minutes. Once the temperature of the mixture had reached 140° C., 1.15 g (1.44 mmol) of Bruggolen® C 10 catalyst (17% w/w ε-caprolactamate in ε-caprolactam) was added as solid at RT to the molten mixture, and polymerization was allowed to proceed for 10 minutes; the system was then quenched by cooling the reactor in water (10° C.). This gave 9.79 g of nylon-6 as solid.

A maximum temperature of 178.7° C. was measured after 55 sec.

The polymer comprises 1.8% of residual caprolactam. The IV of the polymer cannot be measured since the polymer is insoluble in sulfuric acid solution.

Crystallinity was measured as 23%.

Inventive Example 2

9.2 g (81.4 mmol) of ε-caprolactam and 0.80 g of initiator A (22.49% w/w in ε-caprolactam) were mixed at 140° C. in the reactor and kept at a temperature of 140° C. for a couple of minutes. Once the temperature of the mixture had reached 140° C., 0.4 g (0.35 mmol) of Bruggolen® C 10 catalyst (17% w/w ε-caprolactamate in ε-caprolactam) was added as solid at RT to the molten mixture, and polymerization was allowed to proceed for 10 minutes; the system was then quenched by cooling the reactor in water (10° C.). This gave 9.86 g of nylon-6 as solid.

A maximum temperature of 182.8° C. was measured after 66 sec.

The polymer comprises 2.3% of residual caprolactam. The IV of the polymer cannot be measured since the polymer is insoluble in sulfuric acid solution.

Crystallinity was measured as 18%.

The experimental results therefore show that, when comparison is made with conventional processes, the initiator of the invention and the process of the invention provide polyamides with increased molecular weight (and therefore increased viscosity), and also with a higher level of crosslinking (and therefore lower crystallinity).

The invention claimed is:

1. A process for producing polyamide, comprising:
performing anionic polymerization of at least one lactam in the presence of an anionic catalyst and an activator, wherein:
the activator comprises a single activator having an average molecular weight Mw of less than 1500;
the activator comprises a caprolactam-capped polyisocyanate; and
the activator comprises on average more than 3.5 capped isocyanate groups.

2. The process of claim 1, wherein the activator comprises on average more than 4 capped isocyanate groups.

3. The process of claim 1, wherein the activator is a capped aliphatic polyisocyanate.

4. The process of claim 1, wherein the at least one lactam is selected from the group consisting of caprolactam, lauryllactam, and a mixture thereof.

5. The process of claim 1, wherein all lactams are selected from the group consisting of caprolactam, lauryllactam, and a mixture thereof.

6. The process of claim 1, wherein the at least one lactam is a precisely one lactam.

7. The process of claim 1, wherein the anionic catalyst is selected from the group consisting of sodium hydrides, sodium metal, sodium caprolactamate, and a mixture thereof.

8. The process of claim 1, wherein a molar ratio of the lactam to the activator is from 1:1 to 10 000:1.

9. The process of claim 1, wherein a temperature during the polymerization is from 70° C. to 300° C.

10. The process of claim 1, wherein a modulus of elasticity of the polyamide is more than 2000 MPa.

11. A polyamide which can be produced by the process of claim 1.

12. A method for using a polyamide produced by the process of claim 1, as coating, structural element, packaging film, or laser-sintering powder, and/or during rotor molding.

13. The process of claim 8, wherein the molar ratio of the lactam to the activator is from 20:1 to 500:1.

14. The process of claim 9, wherein the temperature during the polymerization is from 100° C. to 170° C.

15. The process of claim 1, wherein the activator is free of a polyol.

16. The process of claim 1, further comprising:
oligomerizing a diisocyanate to obtain the activator prior to performing the anionic polymerization.

* * * * *